United States Patent [19]

Matsukawa et al.

[11] 4,340,290
[45] Jul. 20, 1982

[54] ELECTRIC REWIND DEVICE FOR A CAMERA

[75] Inventors: Nobuo Matsukawa; Kenji Sekine, both of Kawasaki, Japan

[73] Assignee: Nippon Kogaku K.K., Tokyo, Japan

[21] Appl. No.: 229,936

[22] Filed: Jan. 30, 1981

[30] Foreign Application Priority Data

Feb. 5, 1980 [JP] Japan ................. 55-12444[U]

[51] Int. Cl.³ .............................................. G03B 1/18
[52] U.S. Cl. ............................................... 354/173
[58] Field of Search ............................. 354/173, 214

[56] References Cited

U.S. PATENT DOCUMENTS 4,194,824 3/1980 Arai et al. ...................... 354/173

Primary Examiner—Michael L. Gellner
Attorney, Agent, or Firm—Fitzpatrick, Cella, Harper & Scinto

[57] ABSTRACT

An electric rewind device for a camera having a clutch device for causing a sprocket operatively associated with a wind-up mechanism for feeding a roll film wound on a spool in a film magazine to be disconnected from the wind-up mechanism. A rewind coupling capable of being coupled to the spool is driven by a motor to effect film rewind operation and includes a first operating member engageable with the clutch device and movable between a first position for connecting the wind-up mechanism and the sprocket and a second position for breaking the connection between the two. A second operating member operatively associated with the rewind coupling is movable between a third position for disengaging the rewind coupling from the spool and a fourth position for causing the two to engage each other, and means are provided for blocking the movement of the second operating member to the fourth position in response to the movement of the first operating member to the first position and for releasing said blocking in response to the movement of the first operating member to the second position.

5 Claims, 3 Drawing Figures

ELECTRIC REWIND DEVICE FOR A CAMERA

BACKGROUND OF THE INVENTION

1. Field of the Invention

This invention relates to an electric rewind device for a camera.

2. Description of the Prior Art

An electric rewind device for a camera is known in which a sprocket is rendered free by operation of a single rewind operating member while, at the same time, a rewind coupling is brought into engagement with a film magazine shaft and simultaneously therewith, the driving of a rewind coupling is started by a motor to rewind exposed film into a film magazine.

In this device, if the single rewind operating member is operated by mistake during photography, film rewind takes place.

SUMMARY OF THE INVENTION

It is an object of the present invention to provide an electric rewind device in which the above-described malfunctioning is prevented.

To achieve such object, the present invention consists in an electric rewind device for a camera having a clutch device for causing a sprocket operatively associated with a wind-up mechanism for feeding a roll film wound on a spool in a film magazine to be disconnected from the wind-up mechanism and in which a rewind coupling capable of being coupled to the spool is driven by a motor to effect film rewind operation, the electric rewind device including a first operating member engageable with the clutch device and movable between a first position for connecting the wind-up mechanism and the sprocket and a second position for breaking the connection between the two, a second operating member operatively associated with the rewind coupling and movable between a third position for disengaging the rewind coupling from the spool and a fourth position for causing the two to engage each other, and means for blocking the movement of the second operating member to the fourth position in response to the movement of the first operating member to the first position and for releasing said blocking in member to the second position.

According to such construction of the present invention, film rewind cannot take place unless the two operating members are operated and thus, film rewind cannot inadvertently be effected. Also, after the sprocket has been rendered free by operating the first operating member, the second operating member becomes operable and film rewind takes place only after engagement between the rewind coupling and the spool shaft has been accomplished by the operation of the second operating member and therefore, film rewind is effected always after the sprocket has become free, and this eliminates the undesirable possibility that before the sprocket becomes free, film rewind takes place and excessive tension is imparted to the film.

The invention will become more fully apparent from the following detailed description thereof taken in conjunction with the accompanying drawings.

DESCRIPTION OF THE PREFERRED EMBODIMENT

An embodiment of the present invention will hereinafter be described with reference to the drawings.

Figure 1:
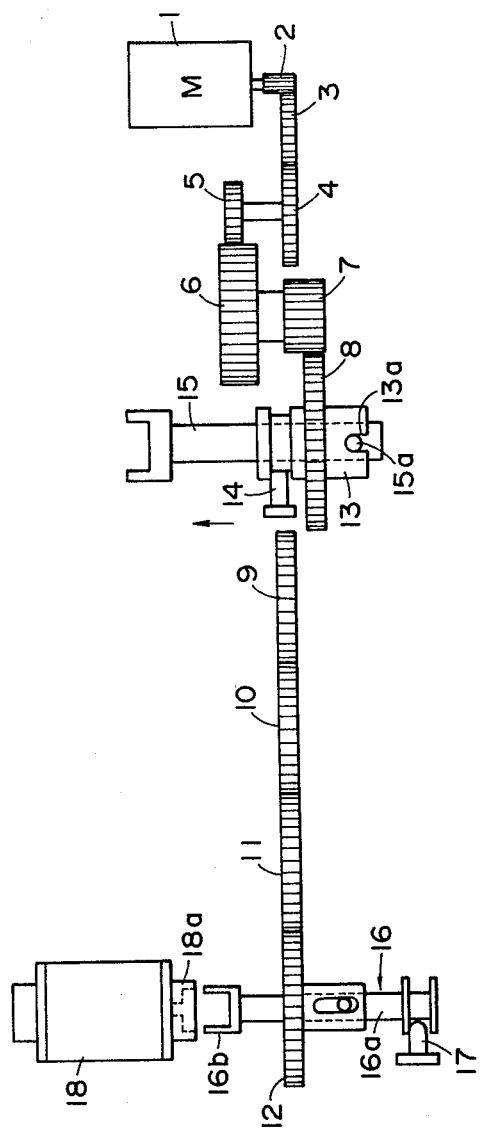
FIGS. 1 and 2 show an embodiment of the present invention, FIG. 1 being a front view of a wind-up and rewind mechanism and FIG. 2 being a perspective view of a rewind operating mechanism for actuating the wind-up and rewind mechanism.

Referring to FIG. 1, reference numeral 1 designates a motor, and reference numerals 2–12 denote transmission gears. Designated by 13 is a sliding member provided integrally with the gear 8 and slidable axially (vertically in the drawing) on a wind-up coupling member 15 by a pin 14 which will hereinafter be described. A pin 15a is provided on the wind-up coupling member 15 and fits in a recess 13a of the sliding member 13 slidable on the member 15. Denoted by 16 is a rewind coupling member rotatable with the gear 12 and slidable axially (vertically in the drawing) by a pin 17 which will hereinafter be described. In the present embodiment, this rewind coupling member 16 comprises a rewind shaft 16a and a rewind coupling 16b integral therewith. A roll film magazine 18 is loaded in a camera body C shown in FIG. 3.

Figure 2:
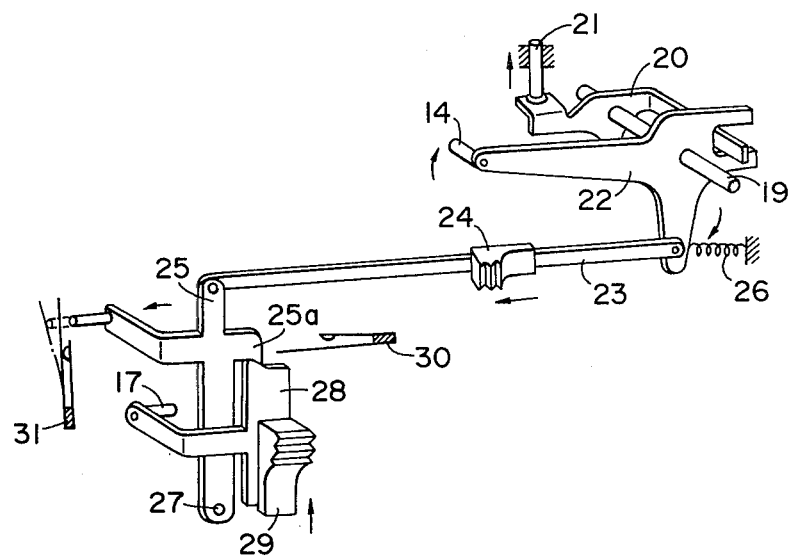
Figure 3:
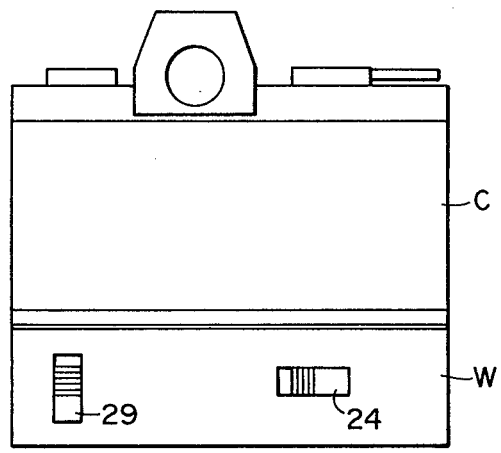
FIG. 3 is a view showing the appearance of the device of the present invention as mounted to a camera.

Referring to FIG. 2, reference numeral 19 designates a rotary shaft and a lever 20 is rotatable on the rotary shaft 19. One end of the lever 20 can push up a pin 21, slidable vertically in the drawing and, when a motor drive device W has been mounted to the camera body C as shown in FIG. 3, the pin 21 becomes opposed to a rewind button (not shown) in the bottom of the camera body. A lever 22 is rotatable on the rotary shaft 19 and rotatable with the lever 20. The pin 14 shown in FIG. 1 is provided on one end of this lever 22. A slide lever 23 is slidable horizontally in the drawing and one end thereof is pivotally supported on the lever 22 while the other end thereof is pivotally supported on a lever 25 which will hereinafter be described. A first operating member 24 is secured to the slide lever 23. A spring 26 biases the lever 23 rightwardly as viewed in the drawing. A lever 25 is rotatably supported on a shaft 27. A slide lever 28 is slidable vertically in the drawing and click-stopped at its lowered position (the shown position) and its lifted position by unshown means. The pin 17 shown in FIG. 1 is provided on this slide lever 28. A second operating member 29 is secured to the slide lever 28. A projected portion 25a of the lever 25 serves to prevent sliding of the slide lever 28. A switch 30 is used to operate the power source circuit of the motor 1 and is adapted to be closed by upward movement of the slide lever 28.

Operation will hereinafter be described.

Wind-up operation will first be described. When a shutter button, not shown, is depressed, exposure operation takes place and, when this operation is terminated, the motor 1 is driven. The rotation of the motor 1 is transmitted to the gears 2–8. A wind-up and rewind mechanism is in the condition shown in FIG. 1 and the pin 15a fits in the sliding member recess 13a and therefore, the wind-up coupling 15 also rotates with the rotation of the gear 8 and the sliding member 13. The rotation of the wind-up coupling 15 is transmitted to a wind-up shaft (not shown) within the camera body which is engaged with the wind-up coupling, and the rotation of this wind-up shaft drives a wind-up mechanism (not shown) within the camera body to effect film advance, shutter charge, etc. In the position of FIG. 1, the gear 8 is not in mesh engagement with the gear 9 and therefore, the rotation of the motor 1 is not transmitted to the gear 9.

Rewind operation will now be described. First, the first operating member 24 shown in FIG. 2 is pushed leftwardly, as viewed in the drawing, against the biasing force of the spring 26. Thereupon, the levers 20 and 22 are rotated clockwisely and the pins 21 and 14 are moved upwardly. By the upward movement of the pin 14, the sliding member 13 shown in FIG. 1 is moved up and the pin 15a comes out of the recess 13a and the gear 8 meshes with the gear 9. At this time, the mesh engagement between the gears 8 and 7 is maintained. The upward movement of the pin 21, after these operations by the pin 14, depresses a rewind button (not shown) provided in the bottom of the camera body and breaks the connection between a rewind mechanism (not shown) within the camera body and a sprocket (not shown) for effecting film feed. This condition is a condition in which the sprocket is free.

The lever 25 pivots counter-clockwisely with the leftward movement of the operating member 24 and, as described, the engagement between the pin 15a and the recess 13a is broken and mesh engagement between the gears 8 and 9 is accomplished, and further, when the free condition of the sprocket is accomplished, the projected portion 25a retracts from the sliding path of the slide lever 28. That is, the lever 28 becomes slidable upwardly from its position of FIG. 2. Next, when the second operating member 29 is pushed upwardly from this state, the pin 17 is moved up and the rewind coupling member 16 shown in FIG. 1 also slides upwardly. The rewind coupling 16b comes into engagement with the shaft 18a of the film magazine 18 contained in the magazine chamber of the camera body. When the operating member 29 is operated to slide upwardly, the switch 30 is closed in response thereto and the motor 1 starts to rotate. The rotation of the motor 1 is transmitted through the gears 2-12 to the rewind coupling member 16, which thus rotates the spool shaft 18a of the film magazine to rewind the exposed film into the magazine 18. In this case, the sprocket has already been brought into its free condition by the operation of the first operating member 24 and therefore, during the rewind, the film does not become tensioned between the sprocket and the magazine. Of course, the engagement between the pin 15a and the recess 13a has been broken and therefore, the rotation of the motor 1 is not transmitted to the wind-up coupling 15. The second operating member 29 is click-stopped at its lifted position and therefore, even if the operator's hand is released, the second operating member 29 does not move downwardly but the position thereof is maintained. Also, by this, the lever 28 remains in its upper position and clockwise rotation of the lever 25 and rightward sliding of the lever 23 are prevented and, even if the operator's hand is released from the first operating member 24, this member 24 remains in its leftwardly moved position. That is, during the rewind operation, the positions of the first operating member 24 and the second operating member 29 are maintained.

Description will now be made of the operation of releasing the rewind operation. When the second operating member 29 is moved downwardly back to its position of FIG. 2 after the unexposed film has all been rewound into the magazine 18, this member 29 is click-stopped at its lowered position. At the same time, by the biasing force of the spring 26, the levers 25 and 23 are moved clockwisely and rightwardly, respectively, back to their positions of FIG. 2. The first operating member 24 also returns to its position shown. The gear 8, the sliding member 13 and the rewind coupling member 16 also return to their positions of FIG. 1.

Even if the operator tries to operate the second operating member 29 without operating the first operating member 24 from its position of FIGS. 1 and 2, he cannot operate the second operating member 29 because the projected portion 25a has come into the sliding path of the lever 28. That is, the second operating member 29 can be operated only after the first operating member 24 has been operated. This means that the rewind coupling member 16 can be engaged with the spool shaft 19a only after the sprocket has been rendered free and that during the rewind, the film does not become tensioned between the sprocket and the magazine.

In the above-described embodiment, the rewind shaft 16a and the rewind coupling 16b have been made integral with each other. However, such a construction is not free of the fear that when one tries to move the rewind coupling 16b upwardly, the engagement between this coupling 16b and the spool shaft 18a is not well accomplished due to the positional relation for mesh engagement between the upper end of the coupling 16b and the lower end of the spool shaft 18a and the upward movement of the coupling 16b is hampered. Accordingly, it is also conceivable to provide the rewind coupling 16b on the upper end of the rewind shaft 16a so that the rewind coupling is rotatable with the shaft 16a and slidable with respect to the axial direction of the rewind shaft 16a and to provide a spring between the rewind coupling 16b and the rewind shaft 16a so as to always bias the rewind coupling 16b upwardly with respect to the rewind shaft 16a. If this is done, even if the upward movement of the rewind coupling 16b is hampered when the second operating member 29 has been operated, only the rewind shaft 16a can be moved upwardly and, when the rewind shaft 16a is rotated by the rotation of the motor 1, the rewind coupling 16b will be rotated integrally therewith and, when the upper end of the rewind coupling 16b assumes a position suited for mesh engagement with the lower end of the spool shaft 18a, the coupling 16b will be pushed up by the force of the spring, whereby engagement between this coupling 16b and the spool shaft 18a may be accomplished.

In the embodiment, the operating direction of the first operating member 24 has been made different from that of the second operating member 29, and this is desirable from the viewpoint of preventing any malfunctioning.

Also, the embodiment has been described with respect to a case where the electric rewind mechanism is incorporated in the motor drive device which is removably mountable to a camera, but even a case where such a motor drive device is contained in the camera body does not depart from the scope of the present invention.

Further, in the above-described embodiment, a switch 31 adapted to be closed when the lever 25 pivots counterclockwisely may be provided and by closing of this switch, an unshown mechanism (or a circuit) may be operated so that shutter release signal is not put out.

We claim:

1. An electric rewind device for a camera having a clutch device for causing a sprocket operatively associated with a wind-up mechanism for feeding a roll film wound on a spool in a film magazine to be disconnected from said wind-up mechanism and in which a rewind coupling capable of being coupled to said spool is driven by a motor to effect film rewind operation, said electric rewind device comprising:
- a first operating member engageable with said clutch device and movable between a first position for connecting said wind-up mechanism and said sprocket and a second position for breaking the connection;
- a second operating member operatively associated with said rewind coupling and movable between a third position for disengaging said rewind coupling from said spool and a fourth position for engaging said rewind coupling to said spool; and
- means for blocking the movement of said second operating member to said fourth position in response to the movement of said first operating member to said first position and for releasing said blocking in response to the movement of said first operating member to said second position.

2. A device according to claim 1, further comprising means for blocking the movement of said first operating member from said second position to said first position during the movement of said second operating member to said fourth position and for releasing said blocking during the movement of said second operating member to said third position.

3. A device according to claim 2, further comprising a biasing member for biasing said first operating member from said second position toward said first position.

4. A device according to claim 1, further comprising clutch means operatively associated with said first operating member to break the connection of said motor to said sprocket and said wind-up mechanism when said first operating member has been moved to said second position and simultaneously therewith, connect said motor to said rewind coupling.

5. A device according to claim 1, further comprising switch means for driving said motor when said second operating member has been moved to said fourth position.

* * * * *